United States Patent [19]

Fischer et al.

[11] 4,013,568

[45] Mar. 22, 1977

[54] COMPOSITION AND METHOD FOR DRILLING FORMATIONS CONTAINING GEOTHERMAL FLUID

[75] Inventors: Paul W. Fischer, Whittier, Calif.; Jerry C. Jones, deceased, late of Memez Springs, N. Mex., Shirley J. Jones, executrix; Delbert E. Pyle, Northridge; Stephen Pye, Brea, both of Calif.

[73] Assignee: Union Oil Company of California, Brea, Calif.

[22] Filed: Dec. 11, 1975

[21] Appl. No.: 639,652

[52] U.S. Cl. .............................. 252/8.5 C; 175/69; 175/71

[51] Int. Cl.² .................... C09K 7/08; C09K 7/02; E21C 7/06

[58] Field of Search ........ 252/8.5 A, 8.5 C, 8.55 B; 175/69, 71

[56] References Cited

UNITED STATES PATENTS

| | | | |
|---|---|---|---|
| 2,552,775 | 5/1971 | Fischer et al. | 252/8.5 |
| 2,650,197 | 8/1953 | Rahn | 252/8.5 |
| 2,923,681 | 2/1960 | Hein et al. | 252/8.5 |
| 3,215,200 | 11/1965 | Kirkpatrick et al. | 175/69 |
| 3,313,362 | 4/1967 | Schneider | 252/8.5 X |
| 3,486,560 | 12/1969 | Hutchison et al. | 175/69 X |
| 3,749,554 | 7/1973 | Fischer et al. | 252/8.55 X |

*Primary Examiner*—Herbert B. Guynn
*Attorney, Agent, or Firm*—Richard C. Hartman; Dean Sanford; Gerald L. Floyd

[57] ABSTRACT

A composition and method for drilling a well into a subterranean formation containing a geothermal fluid utilizing a gas-containing aqueous drilling fluid containing both lignite and a salt of a high molecular weight acrylic polymer.

15 Claims, No Drawings

COMPOSITION AND METHOD FOR DRILLING FORMATIONS CONTAINING GEOTHERMAL FLUID

BACKGROUND OF THE INVENTION

1. Field of the Invention

This invention relates to the drilling of wells into high temperature subterranean formations containing geothermal fluid. More particularly, this invention relates to an improved drilling fluid composition and method of use thereof in the drilling of wells into high temperature geothermal formations.

2. Description of the Prior Art

Drilling wells into subterranean formations containing a geothermal fluid presents many problems concerning the choice of a drilling fluid. Conventional aqueous base drilling fluid containing water, clay and various additives is generally used in drilling the first two to four thousand feet of hole through the usually somewhat incompetent strata above the geothermal formation. Casing is cemented in place over this portion of the hole and drilling is continued using any one of a number of drilling fluids. Problems arise at lower depths when the drill bit penetrates those formations containing a geothermal fluid, which formations often lie several thousand feet below the surface. Such formations are generally highly porous and permeable. If conventional drilling fluid is used, the weight of the high gravity column of drilling fluid in the well is so great that a considerable amount of the fluid invades the formation. This necessitates use of a large additional volume of fluid and results in partial plugging of the formation by the clay and other solids in the fluid. When the well is subsequently completed, this plugging decreases the amount of geothermal fluid which can be produced via the well. If a relatively light-weight drilling fluid, such as air or another gas, is used, a high rate of circulation of the drilling fluid through the system is required to circulate cuttings out of the hole. This high rate of circulation of the drilling fluid together with the fluids produced from the formation, result in corrosion and erosion problems. The high velocity gaseous fluids erode the unconsolidated portions of the formation to such an extent that hole stability cannot be achieved. In many cases, even the drill pipe is eroded.

One solution to these problems has been to drill formations containing a geothermal fluid with aqueous gas-containing drilling fluid. Use of this light-weight, gas-containing drilling fluid comprising a mixture of water, a gas such as air, and optionally a foaming agent, results in increased penetration rates, reduced bit wear and reduced formation damage due to erosion by the drilling fluid as compared with air. However, the water in the drilling fluid easily invades the formation necessitating large quantities of fluid for make up and also can cause plugging. It would be desirable to utilize a light-weight, gas-containing drilling fluid requiring less make up and causing less damage to the formation due to invasion thereof as well as having improved ability to remove cuttings from the hole.

U.S. Pat. No. 2,650,197 issued Aug. 25, 1953 to Rahn and U.S. Pat. No. 3,385,789 issued May 38, 1968 to King describe clay-containing aqueous drilling fluids containing lignite. U.S. Pat. No. 2,552,775 issued May 15, 1951 to Fischer and Cook and U.S. Pat. No. 2,718,497 issued Sept. 20, 1955, to Oldham and Kropa disclose the use of alkali metal and ammonium water-soluble salts of a polymer of acrylic acid in clay-containing aqueous drilling fluids. While the techniques disclosed in these patents have certain advantages, need remains for a drilling fluid composition and method for drilling wells into subterranean geothermal formations that provide reduced penetration of the drilling fluid into the formation and improved wall-building and cuttings-carrying capacity.

Accordingly, a principal object of this invention is to provide a light-weight drilling fluid and method of use thereof suitable for drilling a subterranean formation containing a geothermal fluid.

A further object of the invention is to provide such a composition and method for drilling formations containing high temperature wet stream.

Another object of the invention is to provide such a composition and method which reduces the damage to the formation due to the invasion of drilling fluid into the formation surrounding the well.

Still another object of the invention is to provide such a composition and method having improved wall-building and cuttings-removing properties.

An additional object of the invention is to provide such a composition which does not contain clay.

Other objects, advantages and features of the invention will become apparent from the following description and appended claims.

SUMMARY OF THE INVENTION

A composition and method of use thereof for drilling a well into a subterranean formation containing a geothermal fluid at a temperature of about 350° F. or above comprising circulating through the well during drilling a gas-containing drilling fluid comprising a mixture of water or brine, a gas, a corrosion and erosion inhibitor, a lignite to control fluid loss, a salt of a high molecular weight acrylic acid polymer to improve the wall-building and cuttings-carrying properties and, optionally, a foaming agent.

DETAILED DESCRIPTION OF THE INVENTION

When gases, such as air, carbon dioxide, natural gas, nitrogen or combustion gases, are injected into an aqueous dispersion of clay circulated in a well being drilled, the resulting fluid is referred to as an "aerated drilling mud".

In drilling geothermal formations, it is desirable to use a non-clay-containing drilling fluid. Clay tends to invade the relatively porous geothermal formations and causes plugging problems. In addition, a corrosion inhibitor is required in drilling fluids for geothermal formations to combat the corrosive effects of free-oxygen-containing gases or carbon dioxide in aerated drilling fluid and the formation fluids. However, clay tends to adsorb these corrosion inhibitors so they are not available for their primary purpose.

Thus, there has been developed for drilling geothermal formations an "aerated drilling fluid" wherein a gas is injected into a stream of water or brine circulated in a well being drilled. No clay is employed. The gas may be partially soluble in the aqueous phase but is present largely in a dispersed or entrained form as the fluid passes down the well. As the fluid passes through the drill bit and circulates out of the well, it picks up cuttings and carries them out of the well. During the circulation, the aerated drilling fluid may tend to break up and travel through the well as alternate slugs of aqueous fluid and air. If the circulation rate is maintained relatively high, cuttings are still successfully transported out of the well in spite of the separation of the component parts of the aerated drilling fluid. If a foaming agent is included in the drilling fluid injected into the well, the resulting product is referred to as a "foam drilling fluid" and comprises a dispersion of gas in the aqueous phase. If sufficient foaming agent is utilized, the drilling fluid substantially maintains its integrity during circulation through the well. It is intended that the composition and method of this invention encompass any gas-containing drilling fluid, i.e., both aerated drilling fluid and foam drilling fluid.

The most significant differences between liquid aqueous base drilling fluid and either aerated drilling fluid or foam drilling fluid is that only the former contains clay and only the latter contains air or a similar gas. Clay imparts to liquid aqueous base drilling fluid many desirable properties including higher viscosity, lower fluid loss and improved cuttings-carrying ability. However, clay also imparts some undesirable properties to the drilling fluid including partial plugging of the formation being drilled by the clay particles where the drilling fluid invades the formation. Since aerated drilling fluid and foam drilling fluid do not contain clay, it would be advantageous to provide them with the desirable rheological and fluid loss control properties of a clay-containing liquid drilling fluid without the undesirable plugging effect of the clay.

The reduced hydrostatic pressure exerted on the formation being drilled by a column of aerated drilling fluid or foam drilling fluid as compared to liquid drilling fluid results in reduced invasion of the formation by the drilling fluid. However, there exists a need for still further improved control of fluid loss. Since a large portion of aerated drilling fluid or foam drilling fluid consists of a gas, a relatively poor material to carry cuttings out of the well, it is desired to improve this property of the drilling fluid as well.

The gas-containing drilling fluid of this invention comprises: (1) from about 99.5 to about 90 volume percent gas and (2) from about 0.5 to about 10 volume percent of an aqueous dispersion containing (a) from about 327 to about 347 pounds per barrel water, (b) from about 10 to about 2 pounds per barrel lignite fluid loss control additive, (c) from about 2.5 to about 0.5 pounds per barrel alkali metal or ammonium salt of a high molecular weight acrylic polymer to improve wall-building and cuttings-carrying capacity, (d) from about 1.0 to about 0.05 pounds per barrel organic agent that releases ammonia or a vaporous amine that acts as a corrosion inhibitor an also forms a resinous residue at downhole temperature and pressure conditions that acts as an erosion inhibitor and (e) optionally, from about 10 to about 0.25 pounds per barrel foaming agent.

In a foam drilling fluid the aqueous solution to be foamed usually comprises from about 90 to about 99.75 volume percent aqueous solution to be foamed and from about 10 to about 0.25 volume percent foaming agent. The amount of foaming agent used is sufficient to maintain the foam formed sufficiently stable to be circulated through the drill string without appreciable separation. The foaming agent can be any of a wide variety of known anionic, cationic or nonionic surface active agents. Typical foaming agents are alkyl aryl sulfonates, fatty alcohol sulfates, sulfated and sulfonated amides and amines, sulfated and sulfonated esters and ethers, alkyl sulfonates, quaternary ammonium derivatives, the condensation products of a fatty material with ethylene or propylene oxide, the condensation products of phenolic compounds having lateral aliphatic groups with ethylene oxide and the like.

The foam is formed by combining the aqueous solution to be foamed and gas in a ratio so that the foam produced at downhole conditions of temperature and pressure comprises from about 0.5 to about 10 volume percent aqueous solution to be foamed and from about 99.5 to about 90 volume percent gas. The same ratio of aqueous solution to gas without the presence of a foaming agent can be used to form aerated drilling fluid.

For optimum drilling of geothermal formations, it is necessary to further modify the above-described gas-containing drilling fluids. If air or carbon dioxide is the gas used in the drilling fluid, the resulting composition becomes more corrosive to the drill string and other metal well equipment with which it comes in contact than is liquid drilling fluid. If the gas used is methane, nitrogen or any other non-free-oxygen-containing gas, corrosion can still become a problem when drilling into geothermal fluids containing steam which is picked up and circulated along with the drilling fluid. This corrosion can be reduced by introducing into the circulating gas-containing drilling fluid stream a corrosion inhibitor, such as one that decomposes at downhole temperature and pressure conditions to release ammonia or a vaporous amine which contacts and protects the metal surfaces of well equipment exposed to the gas-containing drilling fluid. The non-volatilized portion of the additive reacts or polymerizes to form a resinous residue that is deposited in part on the exposed metal surfaces and on the solid particles suspended in the drilling fluid, thereby reducing erosion and corrosion of these metal parts. Such erosion and corrosion inhibitors are described in U.S. Pat. No. 3,749,554 issued July 31, 1973 to Fischer, Maly and Pyle.

Generally the organic compounds useful as erosion and corrosion inhibitors are tertiary amines having molecular weights above about 260, and usually above about 300. A preferred class of compounds for use in the practice of the invention are the polyamine salts of an acidic triester of a trialkanol amine, which are generally represented by the following formula:

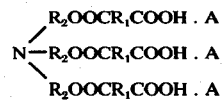

wherein $R_1$ is a bivalent hydrocarbyl radical containing from about 8 to about 44 carbon atoms, $R_2$ is an alkylene radical containing from about 1 to about 4 carbon atoms, and A is ammonia or a water-soluble amine containing from about 1 to about 15 carbon atoms, exemplary of which are the above-described amines. In a particularly preferred embodiment $R_2$ in the above formula is ethylene. While the polyamine compounds can be generally described by the above generalized formula, it is recognized that when polydentate water-soluble amines are used to form the salt, cross-linking between two or more of the polyamine molecules may occur. Thus, when these amines are employed, the polyamine compounds may have repeating acidic triester units.

Particularly preferred polyamine salts are the morpholine, ethylenediamine, N-butylaminoethanol, trimethylamine, dimethylamine, pyridine, triethanolamine, diethylenetriamine, and diethylaminoethanol salts of an acidic triester of triethanolamine, wherein the acidic triester is obtained by esterifying triethanolamine with a long-chain dibasic acid obtained by dimerizing linoleic or isolinoleic acid.

The organic agent can be injected directly into the gas-containing drilling fluid stream, or alternatively, the agent can be mixed with a carrier liquid and this admixture injected into the drilling fluid stream. Suitable carrier liquids are water; monohydroxy aliphatic alcohols having from 1 to 10 carbon atoms; aliphatic amines having from 1 to 10 carbon atoms; aliphatic carboxylic acids having from 1 to 10 carbon atoms; aliphatic aldehydes having from 1 to 10 carbon atoms; ketones having from 1 to 10 carbon atoms and mixtures thereof, especially aqueous mixtures.

In general, the organic agent is admixed with the carrier liquid in the proportion of about 0.001 to 25 weight percent of organic agent based upon the weight of the mixture, and more preferably between 0.005 and about 10 weight percent. Erosion and corrosion of the metal parts exposed to a gas-containing drilling fluid can be substantially reduced by introducing into the drilling fluid from about 0.001 to 1 gallon of the above-described additive mixture in carrier fluid per barrel of aqueous solution to be gasified.

In order to control the penetration of the formation by the gas-containing drilling fluid, lignite is added to the drilling fluid as a fluid loss control additive. Lignite is a class IV coal as set forth in American Standards for Testing Materials (ASTM) Specification of Coals by Rank, D-388-38. Lignite is defined as a variety of coal intermediate between peat and bituminous coal, especially one in which the texture of the original wood is distinct. It is also called "brown coal" or "wood coal". The chemical characteristics and composition of lignite have been widely described in the literature, such as in the Journal of the American Chemical Society, vol. 69 (1947), and in the U.S. Bureau of Mines Information Circular 7691, parts 1 and 2, published July, 1954. In general, the term "lignite" is used herein to mean not only lignite per se, but also all naturally occurring carboniferous materials containing 10 percent or more, preferably 30 to 50 percent, of humic acid. Lignite is used in pulverized, finely particulate form. All of the lignite should pass through a 10 mesh sieve, U.S. Standard sieve series. At least 50 percent of the lignite should preferably pass through a 200 mesh sieve. Lignite is used in an amount of from about 2 to about 10 pounds per barrel aqueous solution to be gasified.

In order to increase both the viscosity and the cuttings-carrying ability of the gas-containing drilling fluid, there is added thereto an alkali metal or ammonium salt of a polymer of acrylic acid, referred to as ammonium and alkali metal polyacrylates. Such polymers and their use in clay-containing liquid aqueous drilling mud is described in U.S. Pat. No. 2,552,775 issued May 15, 1951 to Fischer and Cook. The polymers have an average molecular weight in excess of about 2,000 and are low enough so that their ammonium and/or alkali metal salts are dispersible in aqueous media. In general, it is desirable to use those polymers whose average molecular weight is in the range of 5,000 to 50,000 and preferably in the range of 15,000 to 35,000. The salt of the polymer may be that of any alkali metal such as sodium, potassium and/or lithium. However, the sodium salts are preferred over the other alkali salts and the ammonium salts.

Polymers of acrylic acid which are useful in this invention are readily prepared from the monomer by the action of heat, light, and/or catalysts. Catalysts which are particularly effective for this polymerization are the organic peroxides, such as benzoyl peroxide and cumene hydroperoxide. The properties and nature of the polymer can be varied over a considerable range by the proper choice of catalysts and/or reaction conditions. The polymer can be further modified by the addition of small amounts of copolymerization agents such as acrylonitrile, methyl acrylate, ethyl acrylate, 2-methyl propanoic acid and the like. These copolymers of acrylic acid containing up to about 10 percent by weight of the copolymerization agent are useful and operable in the application of this invention.

A particular polymer of acrylic acid which is suitable for use in this invention is prepared for example by polymerizing acrylic acid dissolved in water to form a 10 percent by weight solution of acrylic acid at a temperature of about 50° to about 100° C. and using as a catalyst about 0.5 percent by weight of benzoyl peroxide based on the amount of acrylic acid present. The polymerization is controlled to give a polymer whose average molecular weight is about 25,000. The reaction is stopped by the neutralization of the reaction mixture with sodium hydroxide after which the sodium polyacrylate is isolated. Potassium, lithium and ammonium polyacrylates are prepared by neutralizing the reaction product with the appropriate hydroxides and these salts are also useful as protecting agents in this invention. Salts of polyacrylates of other molecular weights within the above range are prepared by varying the time, temperature or pressure of the polymerization reaction, the catalyst, or the concentration of the acrylic acid or catalyst, an increase in any of these variables in general tending to increase the average molecular weight of the polymer. Other modes of polymerization, employing no water, or organic solvents, or mixtures of organic solvents and water may also be employed. These are well known in the art. The polymers are used in an amount of from about 0.5 to about 2.5 pounds per barrel of aqueous solution to be gasified and/or foamed.

In utilizing foam drilling fluid, the gas, foaming agent and other additives may be dispersed in the aqueous phase at the surface prior to injection into the well and agitated to form a foam. However, it is generally preferred to inject the gas, foaming agent and other additives into the stream of water or brine being circulated into the well being drilled and form the foam as the fluids pass down the well. In utilizing aerated drilling fluid, the gas and other additives are injected into the stream of water or brine being circulated into the well.

The invention is further described by the following example which is illustrative of a specific mode of practicing the invention and is not intended as limiting the scope of the invention defined by the appended claims.

EXAMPLE

The effectiveness of the composition and method of this invention in drilling a subterranean formation containing a geothermal zone is demonstrated by the following tests. Two offset wells are drilled from the surface to a depth of about 100 feet above the geothermal zone using a rotary bit and conventional aqueous clay-containing drilling mud. It is known from previous wells drilled in the area that when aqueous clay-containing drilling fluid is used to drill the geothermal zone, substantial drilling fluid is lost to the formation resulting in partial plugging of the zone by the drilling fluid. This plugging decreases the rate at which geothermal fluids can be produced following completion of the well.

In the first of the two test wells, drilling is continued while injecting down the drill string 1,000 cubic feet per minute of air and 150 gallons per minute of an aqueous solution containing 150 gallons per minute water and 0.4 pounds per barrel of an erosion and corrosion inhibitor prepared by first mixing together 75 weight percent water, 10 weight percent diethylene triamine and 15 weight percent of an acidic triester prepared by the condensation of triethanolamine and dimerized linoleic acid and then diluting with additional water in the proportion of about 30 gallons of inhibitor to each 10 barrels of water. The well is drilled through the geothermal zone and completed in the usual manner. During the above-described drilling operation, the occurrence of considerable lost circulation of the aerated drilling fluid to the formation is noted.

In the second of the two test wells, drilling is continued by injecting down the drill string the same aerated drilling fluid described above except that the aqueous solution is an aqueous dispersion which includes, in addition to the above-described ingredients, 3 pounds per barrel lignite and 1 pound per barrel of the sodium salt of an acrylic acid polymer having an average molecular weight of around 25,000. The well is drilled through the geothermal zone and completed in the usual manner. During the drilling of this second test well, there is less lost circulation than when using the aerated drilling fluid used in the first test well.

While particular embodiments of the invention have been described, it will be understood, of course, that the invention is not limited thereto since many modifications can be made and it is intended to include within the invention such modifications as are within the scope of the claims.

The invention having thus been described, we claim:

1. A gas-containing aqueous drilling fluid comprising from about 99.5 to about 90 volume percent of a gas and from about 0.05 to about 10 volume percent of a clay-free aqueous dispersion containing from about 327 to about 347 pounds per barrel water, from about 10 to about 2 pounds per barrel lignite, from about 2.5 to about 0.5 pounds per barrel alkali metal or ammonium salt of a homopolymer of acrylic acid or a copolymer containing at least about 90 percent by weight acrylic acid and up to about 10 percent by weight acrylonitrile, methyl acrylate, ethyl acrylate or 2-methyl propanoic acid, which homopolymers and copolymers have an average molecular weight of 5,000 to 50,000 and from about 0.011 to 1 gallon per barrel of a mixture consisting essentially of a carrier liquid containing about 0.001 to 25 weight percent of an organic agent which is a tertiary amine having a molecular weight above 250 that releases ammonia or a vaporous amine and forms a resinous residue at downhole temperature and pressure conditions to function as an erosion and corrosion inhibitor.

2. The composition defined in claim 1 wherein the aqueous dispersion also contains from about 10 to about 0.25 pounds per barrel of a foaming agent.

3. The composition defined in claim 2 wherein the foaming agent is an anionic, cationic or nonionic surface active agent.

4. The composition defined in claim 1 wherein the gas is air.

5. The composition defined in claim 1 wherein the alkali metal or ammonium salt of an acrylic polymer has an average molecular weight of from 15,000 to 35,000.

6. The composition defined in claim 1 wherein the organic agent that releases ammonia or a vaporous amine and forms a resinous residue at downnhole temperature and pressure conditions is a polyamine salt having the formula:

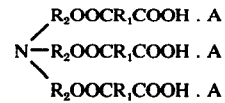

wherein $R_1$ is a bivalent hydrocarbyl radical containing from about 8 to about 44 carbon atoms, $R_2$ is an alkylene radical containing from about 1 to about 4 carbon atoms, and A is a water-soluble amine or ammonia.

7. A gas-containing aqueous drilling fluid for drilling a well into a geothermal fluid-containing zone of a subterranean formation comprising from about 99.5 to about 90 volume percent of a gas and from about 0.5 to about 10 volume percent of a clay-free aqueous dispersion containing from about 327 to about 347 pounds per barrel water, from about 10 to 2 pounds per barrel lignite, from about 2.5 to about 0.5 pounds per barrel sodium salt of a homopolymer of acrylic acid or a copolymer containing at least about 90 percent by weight acrylic acid and up to about 10 percent by weight acrylonitrile, methyl acrylate, ethyl acrylate or 2-methyl propanoic acid, which homopolymers and copolymers have an average molecular weight of from 5,000 to 50,000 and from about 0.001 to 1 gallon per barrel of a mixture consisting essentially of a carrier liquid containing about 0.001 to 25 weight percent of an erosion and corrosion inhibitor which is a polyamine salt of an acidic triester of a $C_1$ to $C_4$ trialkanol amine said polyamine salt having a molecular weight above about 260.

8. The composition defined in claim 7 wherein the aqueous dispersion also contains from about 10 to about 0.25 pounds per barrel of a foaming agent.

9. In the method of drilling a well into a high temperature subterranean formation containing a geothermal fluid wherein a drilling fluid is passed through the well in contact with the subterranean formation during the drilling operation, the improvement which comprises employing as the drilling fluid a composition comprising from about 99.5 to about 90 volume percent of a gas and from about 0.05 to about 10 volume percent of a clay-free aqueous dispersion containing from about 327 to about 347 pounds per barrel water, from about 10 to about 2 pounds per barrel lignite, from about 2.5 to about 0.5 pounds per barrel alkali metal or ammonium salt of a homopolymer of acrylic acid or a copolymer containing at least about 90 percent by weight acrylic acid and up to about 10 percent by weight acrylonitrile, methyl acrylate, ethyl acrylate or 2-methyl propanoic acid, which homopolymers and copolymers have an average molecular weight of 5,000 to 50,000 and from about 0.001 to 1 gallon per barrel of a mixture consisting essentially of a carrier liquid containing about 0.001 to 25 weight percent of an organic agent which is a tertiary amine having a molecular weight above about 250 that releases ammonia or a vaporous amine and forms a resinous residue at downhole temperature and pressure conditions to function as an erosion and corrosion inhibitor.

10. The method defined in claim 9 wherein the aqueous dispersion also contains from about 10 to about 0.25 pounds per barrel of a foaming agent.

11. The method defined in claim 10 wherein the foaming agent is an anionic, cationic or nonionic surface active agent.

12. The method defined in claim 9 wherein the gas is air.

13. The method defined in claim 9 wherein the alkali metal or ammonium salt of an acrylic polymer has an average molecular weight of from 15,000 to 35,000.

14. The method defined in claim 9 wherein the organic agent that releases ammonia or a vaporous amine and forms a resinous residue at downhole temperature and pressure conditions is a polyamine salt having the formula:

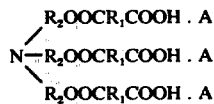

wherein $R_1$ is a bivalent hydrocarbyl radical containing from about 8 to about 44 carbon atoms, $R_2$ is an alkylene radical containing from about 1 to about 4 carbon atoms, and A is a water-soluble amine or ammonia.

15. A method of drilling a well into a high temperature subterranean formation containing a geothermal fluid comprising separately and simultaneously injecting into the well as a drilling fluid from about 99.5 to about 90 volume percent of a gas and from about 0.5 to about 10 volume percent of a clay-free aqueous dispersion containing from about 327 to about 347 pounds per barrel water, from about 10 to about 2 pounds per barrel lignite, from about 2.5 to about 0.5 pounds per barrel sodium salt of a homopolymer of acrylic acid or a copolymer containing at least about 90 percent by weight acrylic acid and up to about 10 percent by weight acrylonitrile, methyl acrylate, ethyl acrylate or 2-methyl propanoic acid, which homopolymers and copolymers have an average molecular weight of from 5,000 to 50,000 and from about 0.001 to 1 gallon per barrel of a mixture consisting essentially of a carrier liquid containing about 0.001 to 25 weight percent of an erosion and corrosion inhibitor which is a polyamine salt of an acidic triester of a $C_1$ to $C_4$ trialkanol amine said polyamine salt having a molecular weight above about 260.

* * * * *

UNITED STATES PATENT AND TRADEMARK OFFICE
CERTIFICATE OF CORRECTION

PATENT NO. : 4,013,568
DATED : March 22, 1977
INVENTOR(S) : PAUL W. FISCHER, JERRY C. JONES, DELBERT E. PYLE and STEPHEN PYE It is certified that error appears in the above–identified patent and that said Letters Patent are hereby corrected as shown below:

Claim 1, column 7, line 55, "0.011" should be corrected to read --0.001--.

Signed and Sealed this

Twenty-fourth Day of May 1977

[SEAL]

Attest:

RUTH C. MASON
Attesting Officer

C. MARSHALL DANN
Commissioner of Patents and Trademarks